Patented Dec. 20, 1938

2,140,545

UNITED STATES PATENT OFFICE 2,140,545

PRODUCTION OF LUBRICANTS

Mathias Pier, Heidelberg, and Friedrich Christmann, Ludwigshafen-on-the-Rhine, Germany, assignors to I. G. Farbenindustrie Aktiengesellschaft, Frankfort-on-the-Main, Germany No Drawing. Application January 19, 1935, Serial No. 2,586. In Germany January 20, 1934

18 Claims. (Cl. 87—9).

The present invention relates to the production of lubricants, more particularly to the synthetic production of substances which may be used directly as lubricants or which may be added to other lubricants for the purpose of improving the properties of the latter.

In the course of the last years numerous processes have been proposed for the synthetic production of such substances. These processes are hereinafter and in the appended claims collectively referred to as "synthetic processes for the production of lubricants".

One class of such "synthetic processes" makes use of the polymerization or condensation of the initial materials under the influence of condensing catalysts which may be defined as "catalysts of the Friedel-Crafts reaction", as for example aluminum chloride, zinc chloride and iron chloride. Such polymerization or condensation which may be referred to as "chemical condensation" may be applied directly to the initial materials when these are unsaturated or contain a sufficient amount of unsaturated constituents, or it may be preceded by a halogenation which may be followed, if so desired, by a splitting off of hydrogen halide. If desired, the said "chemical condensation" may be carried out in the presence of cyclic compounds, in particular cyclic hydrocarbons. As general classes of initial materials suitable for the said "chemical condensation" may be mentioned by way of example mineral oils, tars, their distillation, cracking or destructive hydrogenation products or destructive hydrogenation products of coals. Especially valuable lubricating oils are obtained in the said manner when the initial materials are hydrocarbons of high molecular weight rich in hydrogen, as for example hard or soft paraffin wax, crude paraffin wax, ceresine, ozokerite, petroleum jelly or highly viscous lubricating oils or crude lubricating oils, or alcohols of high molecular weight as for instance ceryl alcohol, or organic acids of high molecular weight, as for instance cerotic acid, or esters of high molecular weight, as for example waxes, for instance Montan wax and beeswax, or glycerides of such fatty acids as stearic acid, palmitic acid and oleic acid, as for example fats or train oils. Mixtures of the said initial materials may also be employed. Lubricating oils may also be prepared from cracking products derived from mineral oils or tars or derived from the products obtained by condensation or polymerization from the said substances of high molecular weight in the presence of condensing catalysts, as for example aluminum chloride, zinc chloride or iron chloride. Furthermore gaseous olefines, such as ethylene and isobutylene may be condensed to form lubricating oils.

Another "synthetic process for the production of lubricants" makes use of that treatment which is known as voltolization, i. e. the treatment with silent electric discharges, preferably of high voltage and high frequency. The initial materials for such treatment may be selected among those referred to in the foregoing which are liquid or solid at ordinary room temperature.

Still another "synthetic process for the production of lubricants" consists in the hydrogenation, especially under pressure, of rubber, resins or other carbonaceous polymerization products of high molecular weight.

On the other hand, it has been recognized that many natural and artificial lubricants, especially lubricating oils, are subject to deterioration under the influence of the atmosphere, and it has therefore been recommended to add antioxidants to the oils, i. e. substances which prevent or hinder oxidation. Such anti-oxidants tend to form heterogeneous mixtures with the lubricants and are liable to be precipitated therefrom on standing.

It is especially with an improvement in the lubricants obtained by the aforesaid "synthetic processes" and with the overcoming of the disadvantages hitherto often inherent with the use of anti-oxidants that the present invention is concerned with.

We have found that artificial lubricating oils of excellent character are obtained by the said "synthetic processes" by carrying out the chemical reaction which leads to the formation of the lubricating oils, in the presence of substances which prevent or hinder oxidation. The lubricating agents thus obtained have a high stability as regards color and great stability in storage. The added substances often seem to take part in the reaction, but in any case they form with the lubricating oils a homogeneous product; the lubricating oils obtained have a continuous boiling point curve.

As substances which prevent or hinder oxidation, there are used according to this invention elementary sulphur or certain organic compounds, namely amino compounds or other bases, nitriles, organic sulphur compounds or organic oxygen compounds. The said organic compounds are preferably of cyclic structure and they may contain several of the elements sulphur, oxygen and nitrogen. Of the said compounds, phenols, as for example resorcinol, pyrocatechol, pyrogallol, naphthol and anthrol, and also hydroquinone and diphenylene oxide are especially suitable. The corresponding alkyl derivatives of these compounds may be employed. Amino compounds, as for example aniline, naphthylamine, phenylnaphthylamine, aminoethylbenzene, aminoanthraquinone, aminobenzaldehyde, aminobenzophenone, diphenylamine, benzylamine, or nitriles, as for example acetonitrile, benzonitrile, naphthonitrile, or other nitrogen compounds, as for example pyridine, quinoline or carbazol, or sulphur compounds, as for example thioacetaldehyde, thiazole, thiocresol, thionaphthol, thionaphthene, thiobenzamide, dimethylthiophene, aminothiophene or ethyl mustard oil, or organic compounds containing both sulphur and oxygen or nitrogen, as for example dihydroxypropylsulphide, toluenesulphamide, aminodiphenylsulphone, diaminodiphenylsulphide, diephenyl thiourea are also suitable. The said products are added to the initial materials in amounts of from 0.05 to 10 per cent or more. It should be noted, however, that when the "synthetic process" is a voltolization, the anti-oxidant used must be one comprising sulphur, i. e. elementary sulphur or an organic sulphur compound.

The condensation products obtained may be added to other oils, especially lubricating oils, or to lubricating greases, for example in an amount of from 0.1 to 10 per cent or more, whereby any oxidation of the oil or grease is prevented or hindered. Depending on the nature of the condensation products, a reduction in the setting point and/or an improvement in the temperature viscosity curve may be effected simultaneously.

The following examples will further illustrate the nature of this invention but the invention is not restricted to these examples. The parts are by weight.

*Example 1*

Hard paraffin wax to which have been added 30 per cent of ceresine and 0.5 per cent of flowers of sulphur is treated for 45 hours at 80° C. in a Siemens ozonization tube under a pressure of from about 5 to 10 millimeters (mercury gauge) with silent electric discharges at about 7000 volts and 1000 periods. The resulting mixture is then subjected to vacuum distillation at 280° C. whereby unchanged paraffin wax and constituents of low boiling point which have been formed are distilled off. The condensation product contains 0.3 per cent of sulphur. It is added in an amount of 1 per cent to a machine oil obtained from German petroleum. The setting point is lowered from zero to 25° below zero C. and even after storage for long periods in the air there is no visible alteration in the color of the oil.

Similar results are obtained when employing phenol instead of flowers of sulphur.

*Example 2*

Chlorine is led into hard paraffin wax at 150° C. until the increase in weight amounts to 14 per cent of the weight of the wax employed. 100 parts of the chlorinated hard paraffin wax are diluted with 100 parts of illuminating oil and condensed for 24 hours at from 30° to 40° C. with 10 parts of naphthalene and 3 parts of carbazole in the presence of 7 parts of aluminium chloride and 6 parts of zinc oxide. After centrifuging off the salts and distilling off the diluent, the product is subjected to a steam distillation in vacuo. In addition to middle oil, 20 parts of unchanged paraffin and light lubricating oil and 70 parts of a nitrogenous condensation product of the character of a cylinder oil having a viscosity of 15° Engler at 100° C. are obtained. The said product is added to a machine oil obtained from German petroleum in an amount of 3 per cent. The setting point is lowered from zero to 25° below zero C. and even after storage for long periods of time in the air there is no visible change in color of the oil.

What we claim is:—

1. A composition of matter comprising a synthetic product of high molecular weight prepared by voltolization in liquid phase of a mixture of an organic compound having a long hydrocarbon chain and a substance selected from the class consisting of elementary sulfur and an organic sulfur compound.

2. A composition of matter comprising a synthetic product of high molecular weight prepared by voltolization in liquid phase of a mixture of hydrocarbon having a long carbon chain and a substance selected from the class consisting of elementary sulfur and an organic sulfur compound.

3. A composition of matter comprising a synthetic product of high molecular weight prepared by voltolization of a mixture of a waxy hydrocarbon and a substance selected from the class consisting of elementary sulfur and an organic sulfur compound.

4. A composition of matter comprising a synthetic product of high molecular weight prepared by voltolization of a mixture of an oxygen-containing organic compound having a long hydrocarbon chain and a substance selected from the class consisting of elementary sulfur and an organic sulfur compound.

5. A composition of matter comprising a synthetic product of high molecular weight prepared by voltolization of a mixture of an organic compound having a relatively long hydrocarbon chain and a carboxyl group and a substance selected from the class consisting of elementary sulfur and an organic sulfur compound.

6. A composition of matter comprising a synthetic product of high molecular weight prepared by voltolization of a mixture of an organic compound having a relatively long hydrocarbon chain and a hydroxyl group and a substance selected from the class consisting of elementary sulfur and an organic sulfur compound.

7. A composition of matter comprising a lubricating oil and a product prepared by voltolizing in liquid phase a mixture of an organic compound having a relatively long hydrocarbon chain and a substance selected from the class consisting of sulfur and organic sulfur compounds.

8. A composition of matter comprising a lubricating oil and a product prepared by voltolizing in liquid phase a mixture of hydrocarbon having a long carbon chain and a substance selected from the class consisting of sulfur and organic sulfur compounds.

9. A composition of matter comprising a lubricating oil and a product prepared by voltolizing a mixture of waxy hydrocarbon and a substance selected from the class consisting of sulfur and organic sulfur compounds.

10. A composition of matter comprising a lubricating oil and a product prepared by voltolizing a mixture of an oxygen containing organic compound having a long hydrocarbon chain and a substance selected from the class consisting of sulfur and organic sulfur compounds.

11. A composition of matter comprising a lubricating oil and a product prepared by voltolizing a mixture of an organic compound having a relatively long hydrocarbon chain and a carboxyl group and a substance selected from the class consisting of sulfur and organic sulfur compounds.

12. A composition of matter comprising a lubricating oil and a product prepared by voltolizing a mixture of an organic compound having a relatively long hydrocarbon chain and a hydroxyl group and a substance selected from the class consisting of sulfur and organic sulfur compounds.

13. A process which comprises adding to an organic compound having a relatively long hydrocarbon chain a substance from the group consisting of elementary sulfur and an organic sulfur compound and then subjecting the mixture to voltolization in liquid phase.

14. A process according to claim 13 in which the organic compound is a hydrocarbon.

15. A process according to claim 13 in which the organic compound is a waxy hydrocarbon.

16. A process according to claim 13 in which the organic compound contains oxygen.

17. A process according to claim 13 in which the organic compound is a carboxyl.

18. A process according to claim 13 in which the organic compound is a hydroxyl.

MATHIAS PIER.
FRIEDRICH CHRISTMANN.